United States Patent
Rugraff

[11] Patent Number: 5,847,481
[45] Date of Patent: Dec. 8, 1998

[54] VEHICLE TRANSMISSION SYSTEM FITTED WITH AN ELECTRICAL RETARDER

[75] Inventor: Guy Rugraff, Pantin, France

[73] Assignee: Labavia SGE, Montigny-le-Bretonneux, France

[21] Appl. No.: 799,795

[22] Filed: Feb. 12, 1997

[30] Foreign Application Priority Data

Feb. 12, 1996 [FR] France ................... 96 01689

[51] Int. Cl.[6] .......................... H02K 49/00; F16H 57/02
[52] U.S. Cl. ........................... 310/105; 310/93; 310/103; 74/606 R; 188/161
[58] Field of Search ............................ 310/93, 103, 105; 188/161, 164; 192/48.2, 48.4, 48.91; 464/29; 74/606 R

[56] References Cited

U.S. PATENT DOCUMENTS

| | | | |
|---|---|---|---|
| 3,908,141 | 9/1975 | Lemonnier | 310/93 |
| 4,745,317 | 5/1988 | Estaque | 310/105 |
| 4,853,574 | 8/1989 | Estaque | 310/105 |
| 4,982,127 | 1/1991 | Marandet | 310/105 |
| 5,044,228 | 9/1991 | Rugraff | 74/606 R |
| 5,115,693 | 5/1992 | Rugraff | 310/93 |

FOREIGN PATENT DOCUMENTS

| | | |
|---|---|---|
| 1386434 | 12/1964 | European Pat. Off. . |
| 0 403 714 | 12/1990 | European Pat. Off. . |

*Primary Examiner*—Nestor Ramirez
*Assistant Examiner*—Burton Mullins
*Attorney, Agent, or Firm*—Marshall, O'Toole, Gerstein, Murray & Borun

[57] ABSTRACT

A vehicle transmission system comprising a gear box having an outlet shaft which drives a universal joint associated with an eddy current electrical retarder having an annular inductor stator cantilevered-out from the case of the gear box together with a rotor constituting a magnetic core and which includes two wheels on either side of the stator. The wheels are fixed to two ends of an intermediate tube surrounding the universal joint, one of its ends also being fixed to a slab that is secured to the outlet from the gear box.

8 Claims, 4 Drawing Sheets

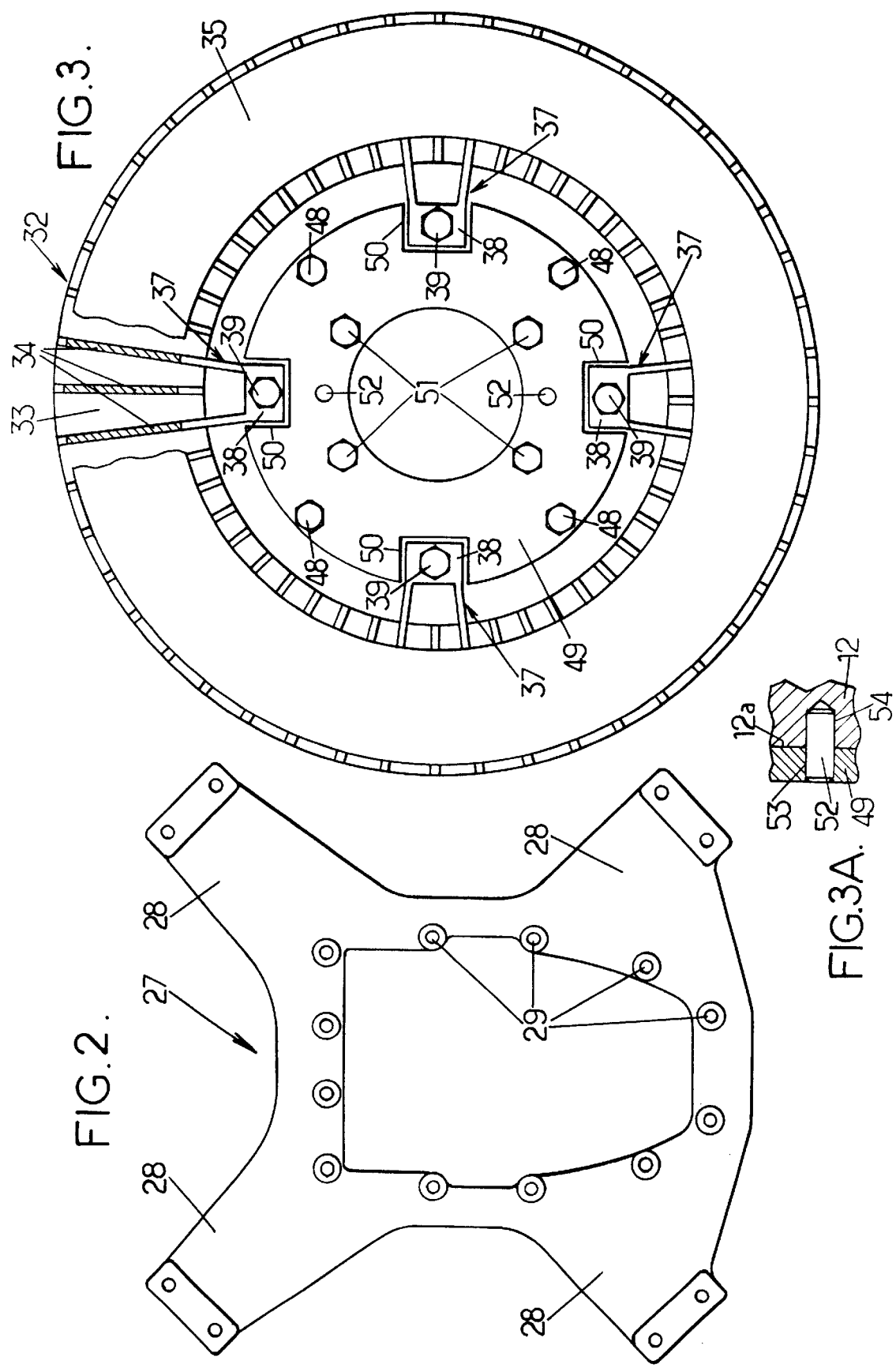

VEHICLE TRANSMISSION SYSTEM FITTED WITH AN ELECTRICAL RETARDER

FIELD OF THE INVENTION

The invention relates to transmission systems for self-propelled land vehicles, i.e. to systems that transmit rotary motion from the engine to the wheels of the vehicle.

In the field of such transmissions, the invention relates more particularly to those which comprise:

- a transmission mechanism driven by the engine of the vehicle and having a case and an outlet shaft rotatable about an axis;
- a universal joint mounted on the outlet shaft of the transmission mechanism; and
- an eddy current electrical retarder comprising both an annular inductor stator cantilevered-out from the case by means of a framework with a ring of coils disposed around the universal joint, and a rotor including first and second wheels, each of the wheels comprising a core disk of ferromagnetic material and a plurality of blades forming cooling fins, the first wheel being close to the case and the second wheel being further away from said case, said two wheels being disposed axially on either side of the stator and being secured to the outlet shaft of the transmission mechanism by means of an intermediate tube extending axially between first and second ends surrounding the universal joint, the first end of the intermediate tube being mounted on a support member secured to the outlet shaft of the transmission mechanism, and the second end of said intermediate tube being secured to the second wheel of the rotor.

BACKGROUND OF THE INVENTION

Document FR-A-2 648 638 describes such a vehicle transmission system.

OBJECTS AND SUMMARY OF THE INVENTION

An object of the present invention is to improve the vehicle transmission system described in that document, in particular so as to enable its diametrical extent to be reduced, given that the space available inside a vehicle in the vicinity of its transmission mechanism is restricted.

To this end, according to the invention, in a transmission system of the kind in question, the first end of the intermediate tube is also secured to the first wheel of the rotor; and the first and second ends of the intermediate tube are disposed axially on either side of the ring of coils of the stator and on either side of the universal joint.

By means of these dispositions, the intermediate tube occupies very little radial space between the universal joint and the ring of stator coils, thereby making it possible either to reduce the diametrical extent of the electrical retarder, or else, for given diametrical extent, to accommodate larger universal joints within the intermediate tube.

In the transmission system of the invention, only the central portion, i.e. the portion of the intermediate tube that does not have any bulky fixing device, needs to be interposed between the universal joint and the ring of coils of the stator, whereas in the system described in the above-mentioned document, it was necessary to provide much greater radial clearance between the universal joint and the stator because, between the intermediate tube and the ring of coils, there were interposed fixing arms for the two wheels of the rotor, which arms were united in the center of the stator coil ring and were fixed to an outside flange of the intermediate tube.

Also, because of the dispositions explained below, the first wheel of the rotor is supported by the first end of the rotor without being cantilevered out, since said first end is also fixed on the support member which is secured to the outlet shaft, and only the second wheel of the rotor is supported in a cantilevered-out position at the second end of the intermediate tube.

Consequently, the intermediate tube is subjected to less stress, and can therefore be lighter in weight, thinner, and less expensive than in prior art devices where both wheels were supported in cantilevered-out positions by the second end of the intermediate tube.

Finally, the invention also makes it possible to simplify the structure of the wheels of the rotor since the fixing arms of the two wheels do not need to be united in the center of the electrical retarder as in prior art devices. The invention thus also makes it possible considerably to reduce the cost of manufacturing the wheels of the rotor.

In preferred embodiments, use is also made of one or more of the following dispositions:

- the intermediate tube includes flanges at its two ends with the two wheels being fixed thereto together with the support member and projecting radially inwards, the intermediate tube thus having an outside surface that is substantially cylindrical;
- each of the wheels of the rotor presents a plurality of fixing arms extending inwards to respective ends fixed laterally to the corresponding flange of the intermediate tube by means of screws;
- at least some of the fixing screws for the wheels of the rotor pass respectively through metal rings, each of said metal rings being engaged as a force-fit simultaneously in two bores formed respectively in the corresponding flange of the intermediate tube and in the end of the corresponding fixing arm;
- the fixing arms of the second wheel of the rotor are four in number and are disposed at right angles relative to one another, and the flange situated at the second end of the intermediate tube forms four internal regions of scalloping disposed angularly between the fixing arms of the second wheel;
- the support member for the intermediate tube is a slab screwed laterally to the flange situated at the first end of the intermediate tube and having outwardly directed notches in which the ends of the fixing arms of the first wheel of the rotor are received;
- each of the wheels of the rotor has a plurality of fixing arms all extending in the same radial plane; and
- the transmission mechanism is a gear box.

BRIEF DESCRIPTION OF THE DRAWINGS

Other characteristics and advantages of the invention appear from the following detailed description of embodiments thereof given as non-limiting examples, with reference to the accompanying drawings.

In the drawings:

FIG. 2 is a diagrammatic view seen along direction II of FIG. 1, showing the framework which supports the stator of the electrical retarder;

FIG. 3 is a view seen along direction III of FIG. 1, showing the rotor of the electrical retarder;

FIG. 3A is a view showing a detail of FIG. 3 in section;

MORE DETAILED DESCRIPTION

In the various figures, the same references are used to designate elements that are identical or similar.

Figure 1:
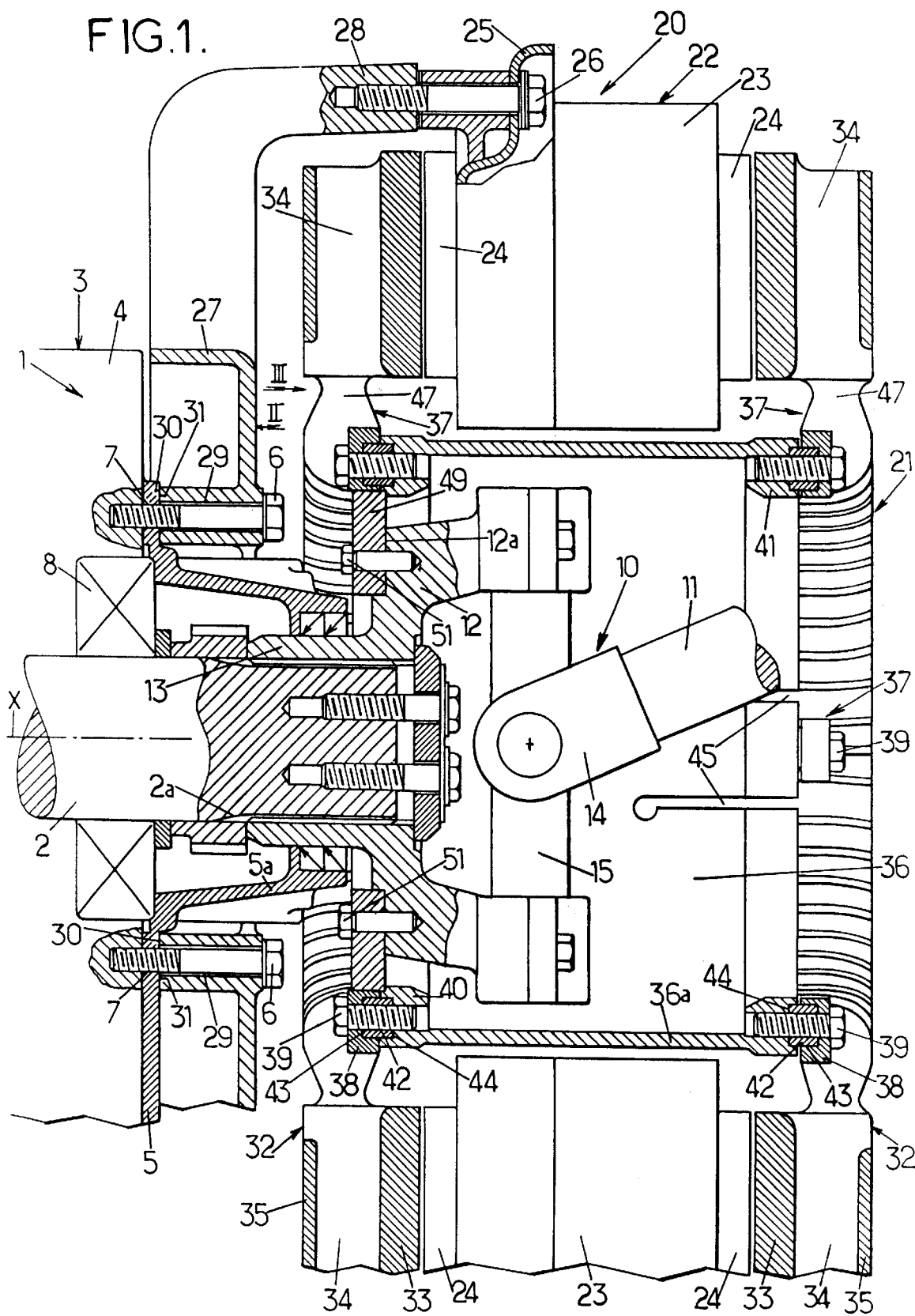
FIG. 1 is a fragmentary diagrammatic vertical section view of a vehicle transmission system constituting an embodiment of the invention, the section plane being locally offset in the vicinity of two fixing screws for the transmission mechanism closure plate and in the vicinity of a fixing screw for the stator of the electrical retarder.

FIG. 1 shows a portion of a motor vehicle transmission system, in particular for a truck or a bus.

This transmission comprises:

- a gear box 1 driven by the vehicle engine (not shown) and having an outlet shaft 2 that rotates about a substantially horizontal axis X;
- a universal joint 10 in a standard axial position, and independent of the presence or otherwise of an electrical retarder, said universal joint being driven by the outlet shaft 2 and itself driving a link shaft 11 which extends generally towards a second universal joint (not shown) connected to a back axle (not shown), one of the forks of the universal joint 10 (the fork 12) being provided with a sleeve 13 having internal fluting and engaged on the end of the outlet shaft 2, which end is provided with external fluting 2a corresponding with the internal fluting of the sleeve 13; and
- an electrical eddy-current retarder 20 mounted in a cantilevered-out position on the gear box 1, with this type of retarder being known under the registered trademark "FOCAL".

The various elements above are described in detail below.

With reference initially to the gear box 1, it is defined externally by a case 3 comprising both a main body 4 and a front closure plate 5.

The closure plate 5 does not have the support portion specially designed for mounting the electrical retarder, and more generally, it is designed independently of the presence or otherwise of an electrical retarder.

The closure plate 5 is fixed in sealed manner on the main body 4 of the case by means of screws 6 passing through holes 7 in said closure plate and screwed into the main body 4.

The closure plate 5 lies in a general plane that is perpendicular to the axis X and it has an annular central projection 5a projecting outwards. The central projection 5a is pierced by the outlet shaft 2, and it also receives the sleeve 13 of the fork 12.

Also, in the vicinity of said central projection 5a, the outlet shaft 2 is supported by an end bearing constituted by a ball bearing 8 which is standard and which is dimensioned independently of the presence or otherwise of the electrical retarder 20.

In conventional manner, the electrical retarder 20 comprises a core 21 that rotates with the shaft 2 and an inductor 22 that is stationary and includes electromagnetic coils 23 which, when carrying an electrical current, generate eddy currents in the rotor 21, thereby causing said rotor to exert braking torque on the shaft 2.

There is an even number of stator coils 23, with each coil having its own respective ferromagnetic core (not shown) extending longitudinally parallel to the axis X between two poles 24. The set of poles 24 forms two rings centered on the axis X, the poles 24 in each of the ring being alternately north and south.

The coils 23 and their respective cores are carried by a rigid end plate 25 of non-magnetic material that is substantially annular in shape and that is itself fixed by screws 26 to four arms 28 of a framework 27.

The framework 27 which is clearly visible in FIGS. 1 and 2 is constituted by a rigid part that can be made, for example, as a GS type casting, and that has holes 29 in register with the holes 7 of the closure plate.

The above-mentioned screws 6 pass through these holes 29, with the heads of the screws pressing against the outside face of the framework 27, thereby simultaneously securing said framework and the closure plate 5 to the main body 4 of the case, such that the closure plate 5 is clamped between the framework 27 and the main body 4.

In order to enable such clamping to be performed under good conditions, it may possibly be necessary to interpose pieces of shim between the fixing plate 5 and the framework 27 in the vicinity of the screws 6.

However, it is preferable to machine the annular bearing surfaces 30 so that they are accurately plane and accurately perpendicular to the axis X on the outside face of the closure plate 5 around each of the holes 7, and for the framework 27 similarly to include machined bearing surfaces 31 that are accurately plane and accurately perpendicular to the axis X. The bearing surfaces 30 and 31 are disposed in register and they are in mutual contact, thereby enabling the framework 27 to bear properly against the closure plate 5.

The rotor 21, which is clearly visible in FIGS. 1 and 3, also includes two wheels 32 each of which lies in a radial plane, and both of which are made of ferromagnetic material, generally of steel.

Each of the wheels 32 comprises a relatively thick annular disk 33 disposed facing one of the rings of poles 24 of the stator, with a narrow gap (e.g. 1 mm to 3 mm) being left between said disk 33 and the corresponding poles 24.

Each disk 33 is secured to a ring of blades 34 forming cooling fins and all extending in the radial plane of the corresponding wheel 32.

In addition, in the example shown in the drawings, each set of blades extends in a radial direction, but optionally each of them could extend in a direction that is inclined relative to the radial direction, while still remaining in the radial plane of the corresponding wheel 32.

On the face of each wheel 32 that is further from the stator, the sets of blades 34 are also spaced apart by a relatively thin angular disk 35.

This disk 35 thus co-operates with the thick disk 33 to define an annular space in which the blades 34 are disposed and in which cooling air for the wheels 32 is channeled.

Also, each wheel 32 of the rotor is mounted at one of the axial ends of an intermediate tube 36 of steel that is generally in the form of a circular cylinder about the axis X.

In order to make this assembly, each wheel 32 of the rotor includes four fixing arms 37 disposed at 90° to one another and each constituted by two blades 34 extended inwardly to a fixing plate 38, itself fixed to the intermediate tube 36 by a screw 39 parallel to the axis X.

In the example shown in FIG. 3, the two blades 34 together forming each fixing arm 37 are themselves separated by an intervening blade 34 that is not extended radially inwards, but this particular disposition is not limiting.

The fixing arms 37 extend in the radial plane of the corresponding wheel 32 without extending diagonally axially towards the midplane of the retarder, as used to be the case in prior art electrical retarders: this makes the wheels 32 easier to make, particularly when the wheels are made by molding.

Figure 6:
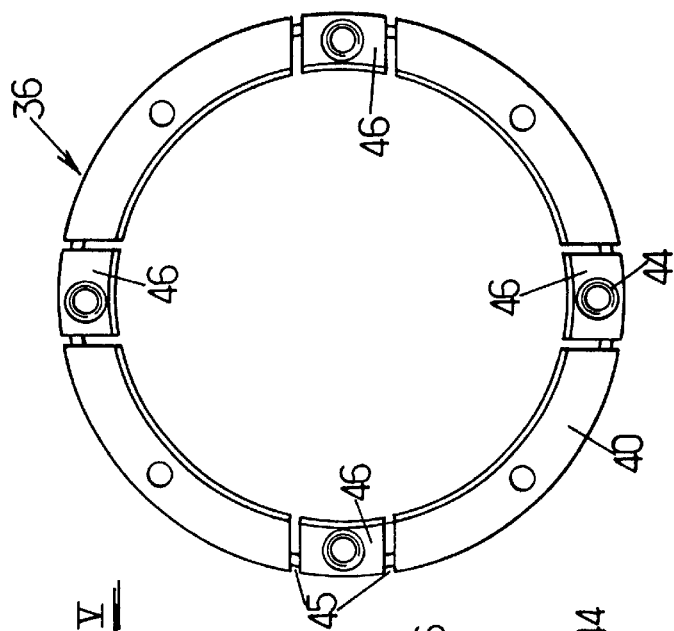
FIGS. 5 and 6 are end views of the FIG. 4 tube, as seen respectively in directions V and VI of FIG. 4.
Figure 4:
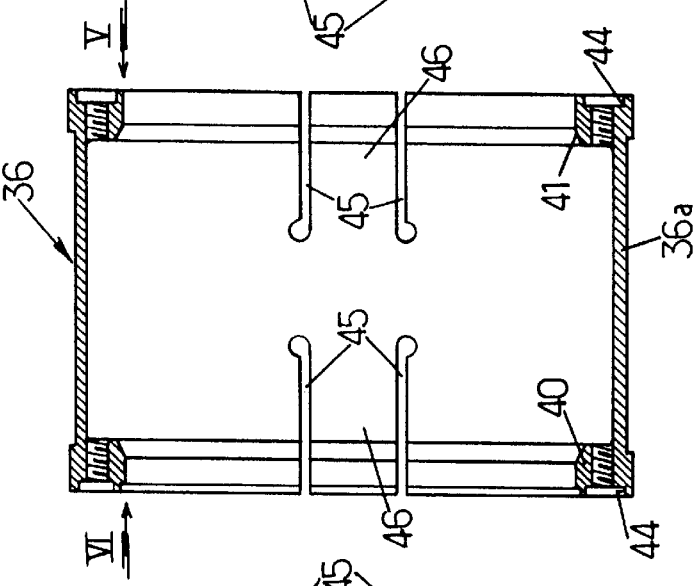
FIG. 4 is a view in axial section showing a detail of an intermediate tube belonging to the rotor of the electrical retarder in the transmission system shown in FIG. 1.
Figure 5:
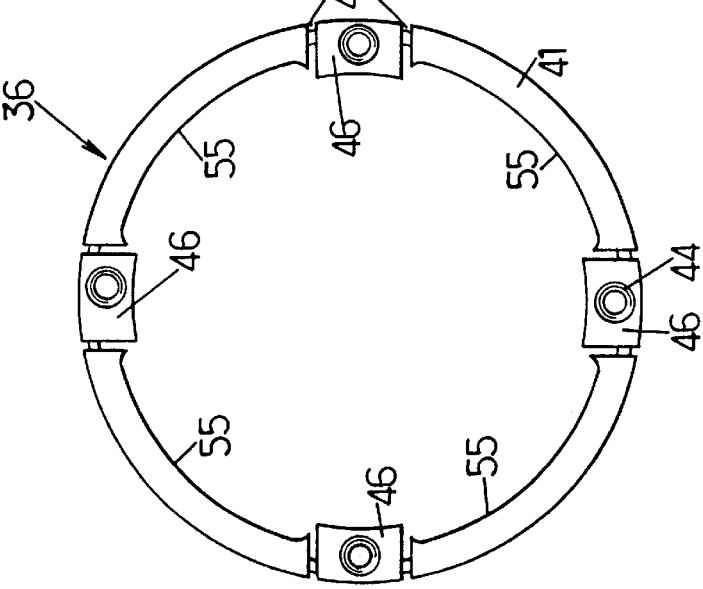

Also, the intermediate tube 36 which is shown in detail in FIGS. 4 to 6 has first and second substantially annular flanges 40 and 41 at its respective ends, with the screws 39 for securing the wheels 32 being screwed thereto.

In order to minimize angular clearance for mounting the wheels 32 on the flanges, the screws 39 pass through steel rings 42 each of which is a force-fit both in a bore 43 belonging to the corresponding plate 38, and in a bore 44 belonging to the corresponding flange 40, 41.

In addition, the intermediate tube 36 preferably includes slots 45 extending axially towards the inside of the tube from one or the other of the two ends of the tube, with each slot 45 extending over less than half the axial length of the tube, e.g. over about ⅓ the length of the tube.

The slots 45 are disposed in pairs on either side of each screw 39, thereby defining axial tongues 46 at both ends of the tube 36 with the arms 37 of the wheels 32 being fixed to the ends of said blades.

These metal tongues 46 are strong enough to avoid being significantly deformed under the effect of the external constraints to which the wheels 32 are subjected, and in particular:

the weights of the wheels 32 (e.g. about 30 kg per wheel);
the vertical dynamic constraints due to the running of the vehicle, which can give rise for example to accelerations of as much as 2 g to 3 g, depending on the circumstances of use;
the braking torque obtained in operation of the electrical retarder, said torque possibly taking a value of about 2,000 Nm to 2,500 Nm, for example; and
the magnetic attraction force to which the wheels 32 are subjected towards the poles 24, said force possibly exceeding one (metric) ton, for example, depending on the size of the air gap.

In contrast, the metal tongues 46 are dimensioned so as to be capable of deforming elastically radially towards the outside when the wheels 32 of the rotor are subjected to thermal expansion due to the high temperatures to which they can be raised in operation of the retarder, thereby compensating for lack of radial deformability in the fixing arms 37.

Where appropriate, the fixing arms 37 may also be designed to be capable of radial deformation. Such deformability may be obtained, for example, by giving sufficient curvature to the extensions of the blades 34 constituting the fixing arms 37, which fixing arms preferably remain situated in the same radial plane as the corresponding wheels 32.

In addition, each of the blades 34 which extend radially inwards to form a fixing arm 37 preferably presents a narrowing 47 in the X direction between the disk 33 and the corresponding plate 38.

This narrowing 47 serves to reduce the stiffness of the arms 37 in bending, thereby limiting the stresses due to thermal deformation of the parts.

Finally, the first flange 40 of the intermediate tube 36 is fixed to a steel slab 49 by means of four screws 48 that are angularly offset by 45° relative to the screws 39.

The slab 49 is situated substantially in the same radial plane as the plates 38 for fixing the wheels 32, and it has external notches 50 through which said plates 38 pass.

The slab 49 is fixed by means of screws 51 to the rear face 12a of the fork 12 of the universal joint, in an annular space left free between the fork 12 and the closure plate 5.

The rear face 12a is formed by an outer shoulder presented by the fork 12, and said rear face is preferably machined so as to be accurately plane and perpendicular to the axis X.

In order to guarantee assembly without angular clearance of the slab 49 relative to the fork 12, the screws 51 are advantageously associated with metal pegs 52 constituting force-fits both in respective bores 53 passing axially through the slab 49 and in respective blind bores 54 penetrating into the fork 12 from its rear face 12a (see FIG. 3A).

It will be observed that the above-described intermediate tube 36 is effective in limiting the diametrical extent of the electromagnetic retarder.

The central portion 36a of the intermediate tube, lying axially between the two flanges 40 and 41 can be situated radially very close to the coils 23 since the fixing arms 37 of the two wheels 32 are not united in the center of the rings of coils 23, unlike prior art devices.

Also, because the central portion 36a of the intermediate tube needs to support only one wheel 32 and not two wheels, this central portion can be relatively thin and, for example, its thickness may be about 6 mm.

Also, the flanges 40 and 41 of the intermediate tube 36 extend radially inwards relative to the central portion 36a of the tube, such that the intermediate tube has substantially no portions projecting radially outwards, thus making it possible both to insert the intermediate tube 36 easily into the ring of coils 23 in spite of the small amount of radial clearance that exists between the set of coils and the ring, and also to limit the radial extent of the intermediate tube.

The fact that the flanges 40 and 41 are disposed on the inside of the intermediate tube does not hinder in any way the operation of the universal joint 10 insofar as the flange 40 is secured to the fork 12 of said joint while the flange 41 is situated axially beyond the other fork 13 going away from the gear box, i.e. in register with the shaft 11, taking up much less space than the universal joint 10.

Finally, to further restrict the radial clearance required between the universal joint 10 and the central portion 36a of the intermediate tube, the second flange 41 of said intermediate tube has scalloping 55 on the inside in its portions extending between the deformable tongues 46.

A large universal joint can thus be mounted inside the intermediate tube 36 by passing the branches of the cross-member 15 of the universal joint and the two forks 12 and 14 thereof via the scalloping 55.

The above-described device can be made completely in the factory on initial assembly of the transmission system, however it can also be made by retrofitting the electrical retarder to a transmission system that is already mounted on a vehicle.

Under such circumstances, it is preferable to proceed as follows:

after disassembling the universal joint 10, at least some of the fixing screws 6 for the closure plate 5 are removed;
the bearing surfaces 30 are machined on the outside face of the closure plate 5;
the initial screws 6 are replaced by longer fixing screws 6, and the framework 27 is fixed to the case by means of these new screws, while simultaneously clamping the closure plate 5 between the framework 27 and the main body 4 of the case;

the rear face 12a of the fork 12 is machined so as to give it a surface that is accurately plane and perpendicular to the axis X;

three tapped holes are formed in the fork 12, starting from its rear face;

the fork 12 is engaged inside the intermediate tube 36 that has previously been fixed to the slab 49, and the fork 12 is fixed to the slab 49 by means of screws 53;

bores 53 and 54 are pierced simultaneously through the slab 49 and in the fork 12, after which metal pegs 52 are force-fitted in said bores, the fork 12 is reassembled onto the outlet shaft 2 from the gear box, and simultaneously the end plate 25 of the stator is fitted to the framework 27 by means of screws 26; and the universal joint 10 and the shaft 11 are fully reassembled.

Figure 7:
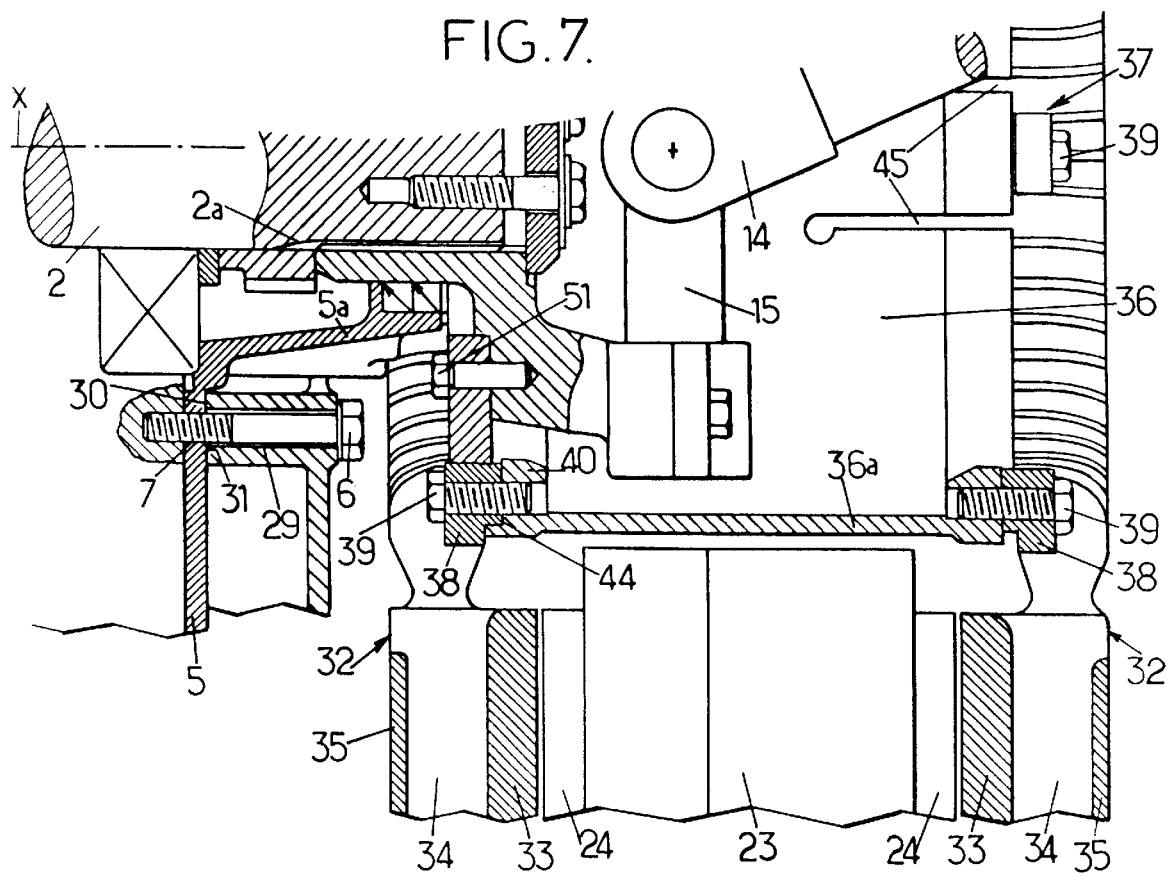
FIGS. 7 and 8 are fragmentary views similar respectively to FIGS. 1 and 3 showing a variant of the system shown in FIGS. 1 to 6.
Figure 8:
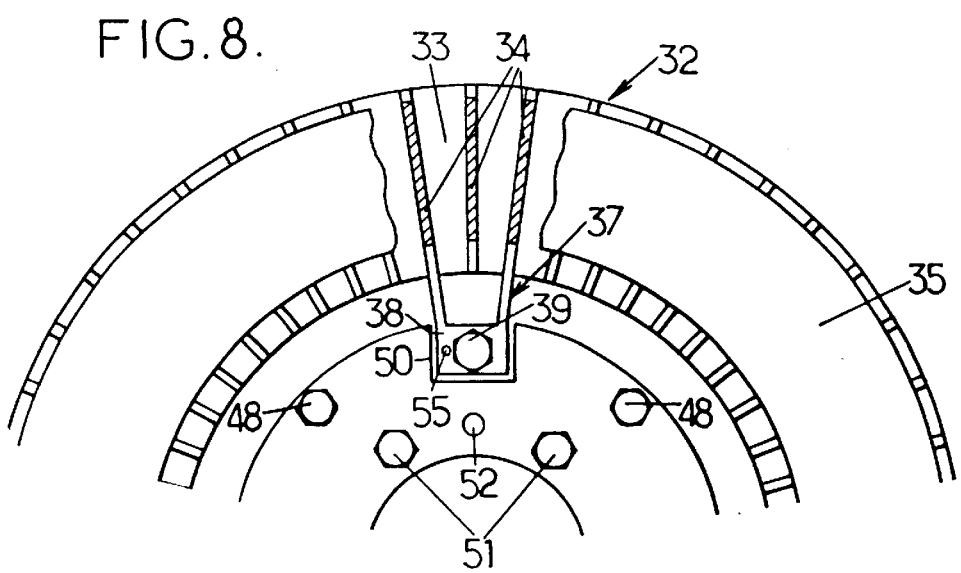

It will be observed that the rings 42 used for mounting the wheels 32 can advantageously be omitted, as shown in FIGS. 7 and 8.

In this case, it is preferable to provide metal pegs 55 disposed adjacent to at least some of the screws 39 and engaged as force-fits both in the corresponding plate 38 and in the corresponding flange 40, 41.

I claim:

1. A transmission system for a self-propelled land vehicle, the system comprising:

a transmission mechanism driven by the engine of the vehicle and having a case and an outlet shaft rotatable about an axis;

a universal joint mounted on the outlet shaft of the transmission mechanism; and an eddy current electrical retarder comprising both an annular inductor stator cantilevered-out from the case by means of a framework with a ring of coils disposed around the universal joint, and a rotor including first and second wheels, each of the wheels comprising a core disk of ferromagnetic material and a plurality of blades forming cooling fins, the first wheel being close to the case and the second wheel being further away from said case, said two wheels being disposed axially on either side of the stator and being secured to the outlet shaft of the transmission mechanism by means of an intermediate tube extending axially between first and second ends surrounding the universal joint, the first end of the intermediate tube being mounted on a support member secured to the outlet shaft of the transmission mechanism, and the second end of said intermediate tube being secured to the second wheel of the rotor;

wherein the first end of the intermediate tube is also secured to the first wheel of the rotor; and wherein the first and second ends of the intermediate tube are disposed axially on either side of the ring of coils of the stator and on either side of the universal joint.

2. A transmission system according to claim 1, in which the intermediate tube includes flanges at its two ends with the two wheels being fixed thereto together with the support member and projecting radially inwards, the intermediate tube thus having an outside surface that is substantially cylindrical.

3. A transmission system according to claim 2, in which each of the wheels of the rotor presents a plurality of fixing arms extending inwards to respective ends fixed laterally to the corresponding flange of the intermediate tube by means of screws.

4. A transmission system according to claim 3, in which at least some of the fixing screws for the wheels of the rotor pass respectively through metal rings, each of said metal rings being engaged as a force-fit simultaneously in two bores formed respectively in the corresponding flange of the intermediate tube and in the end of the corresponding fixing arm.

5. A transmission system according to claim 3, in which the fixing arms of the second wheel of the rotor are four in number and are disposed at right angles relative to one another, and the flange situated at the second end of the intermediate tube forms four internal regions of scalloping disposed angularly between the fixing arms of the second wheel.

6. A transmission system according to claim 3, in which the support member for the intermediate tube is a slab screwed laterally to the flange situated at the first end of the intermediate tube and having outwardly directed notches in which the ends of the fixing arms of the first wheel of the rotor are received.

7. A transmission system according to claim 1, in which each of the wheels of the rotor has a plurality of fixing arms all extending in the same radial plane.

8. A transmission system according to claim 1, in which the transmission mechanism is a gear box.

* * * * *